(12) United States Patent
Fan et al.

(10) Patent No.: US 11,102,219 B2
(45) Date of Patent: Aug. 24, 2021

(54) SYSTEMS AND METHODS FOR DYNAMIC ANALYSIS AND RESOLUTION OF NETWORK ANOMALIES

(71) Applicant: AT&T Intellectual Property I, L.P., Atlanta, GA (US)

(72) Inventors: James Fan, San Ramon, CA (US); Alireza Hooshiari, Alpharetta, GA (US); Dan Celenti, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 255 days.

(21) Appl. No.: 15/685,563

(22) Filed: Aug. 24, 2017

(65) Prior Publication Data

US 2019/0068619 A1 Feb. 28, 2019

(51) Int. Cl.
*H04L 29/06* (2006.01)
*H04L 12/24* (2006.01)
*H04L 12/26* (2006.01)

(52) U.S. Cl.
CPC ........ *H04L 63/1416* (2013.01); *H04L 41/064* (2013.01); *H04L 41/0681* (2013.01); *H04L 63/1425* (2013.01); *H04L 63/1433* (2013.01); *H04L 41/06* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,610,213 B2 | 10/2009 | Jones et al. | |
| 7,984,007 B2 | 7/2011 | Reumann et al. | |
| 8,028,197 B1 | 9/2011 | Barua et al. | |
| 8,086,897 B2 | 12/2011 | Pramidi et al. | |
| 8,473,432 B2 | 6/2013 | Anerousis et al. | |
| 9,172,809 B1 | 10/2015 | Mockus et al. | |
| 2008/0168558 A1* | 7/2008 | Kratzer | H04L 63/20 726/23 |
| 2010/0042468 A1 | 2/2010 | Doan et al. | |

(Continued)

OTHER PUBLICATIONS

Liu et al., A Bayesian Gme Approach for Intrusion Detection in Wireless Ad Hoc Networks, 2006, GameNets'06, pp. 1-12 (Year: 2006).*

(Continued)

*Primary Examiner* — Luu T Pham
*Assistant Examiner* — Edward X Long
(74) *Attorney, Agent, or Firm* — BakerHostetler

(57) ABSTRACT

Systems and methods to manage operation of at least one network is provided. The system includes a processor, an input/output device coupled to the processor, and a memory coupled with the processor. The memory comprises executable instructions that when executed by the processor cause the processor to effectuate operations. The operations include identifying at least one event signature associated with an event, wherein the event signature is indicative that it is probable that at least one user of the network will experience a predefined service anomaly. Operation of the network is monitored for a presence of the at least one event signature. The presence of the at least one event signature is detected. At least one action is determined to deter the predefined service anomaly. The action is caused to be implemented on the network.

17 Claims, 9 Drawing Sheets

(56) References Cited

U.S. PATENT DOCUMENTS

| | | |
|---|---|---|
| 2011/0270770 A1 | 11/2011 | Cunningham et al. |
| 2014/0358609 A1 | 12/2014 | De Assuncao et al. |
| 2015/0222656 A1* | 8/2015 | Haugsnes ............... G06F 16/24 726/23 |
| 2015/0222658 A1* | 8/2015 | Kim .................... H04L 63/1466 726/22 |
| 2015/0278823 A1 | 10/2015 | Kushnir et al. |
| 2016/0042288 A1 | 2/2016 | Cohen et al. |
| 2016/0149887 A1* | 5/2016 | Katmor ................ H04L 69/161 726/1 |
| 2016/0350133 A1* | 12/2016 | Imai ....................... G06F 9/451 |

OTHER PUBLICATIONS

Parwez et al., Big Data Analytics for User-Activity Analysis and User Anomaly Detection in Mobile Wireless Network, 2017, IEEE Transactions on Industrial Informatics, vol. 13, No. 4, pp. 2058-2065. (Year: 2017).*
Brennen Lynch; "Increase Operational Intelligence & Reduce Cost of Care through Dynamic Root Cause Analysis & Predictive Network Maintenance"; Cable-Tec Expo; Sep. 2014; 21 pages.

* cited by examiner

SYSTEMS AND METHODS FOR DYNAMIC ANALYSIS AND RESOLUTION OF NETWORK ANOMALIES

TECHNICAL FIELD

This disclosure relates generally to network management and, more specifically, to management of networks to cause preemptory resolution of network anomalies.

BACKGROUND

Communication networks have grown in both size and complexity. The growth in size has made it difficult to identify and respond to the problems that users face when using such networks. For example, a network user facing a sudden deterioration in service will contact a service department, which will then be faced with diagnosing the source of the problem, creating a solution, and then implementing a fix. This becomes increasingly difficult as the size of the network increases because there will be a corresponding increase in the amount of network equipment in which the source of the problem may reside. Locating the source of the problem becomes more difficult because of the large number of possibilities as to where the source may reside.

The growth of complexity of networks also presents challenges. Networks have migrated from using specialized networking equipment executing on dedicated hardware, like routers, firewalls, application specific servers, and gateways, to reconfigurable networks, such as software defined networks (SDNs), executing as virtualized network functions (VNFs). VNFs are a set of virtual machines (VMs) that are instantiated on general-purpose hardware. These VNFs could be located anywhere for a particular customer. Therefore, when such a customer notifies a network service provider of a problem, the provider does not have the ability to simply run diagnostics on particular network equipment dedicated to the customer because the VNFs could be running in a number of different locations and on a number of different devices. Therefore, locating, diagnosing, and fixing network anomalies has become more and more time consuming. This is frustrating for users because such anomalies degrade their ability to rely on these networks in the fulfillment of their business and personal objectives. Accordingly, what are needed are systems and methods for dynamic analysis and resolution of network anomalies.

SUMMARY

Systems and methods to manage operation of at least one network is provided. The system includes a processor, an input/output device coupled to the processor, and a memory coupled with the processor. The memory comprises executable instructions that when executed by the processor cause the processor to effectuate operations. The operations include identifying at least one event signature associated with an event, wherein the event signature is indicative that it is probable that at least one user of the network will experience a predefined service anomaly. Operation of the network is monitored for a presence of the at least one event signature. The presence of the at least one event signature is detected. At least one action is determined to deter the predefined service anomaly. The action is caused to be implemented on the network.

In one embodiment, monitoring operation of the network comprises receiving information, in real time, describing operation of the network and analyzing the information for presence of the at least one event signature. In one embodiment, historical information describing operation of the network during a time period is analyzed. At least one occurrence of the service anomaly is identified. It is detected that one or more conditions were present before or during the service anomaly. In one embodiment, analysis of historical information comprises reviewing user information taken during the time period, wherein the user information contains at least one indication that the at least one user experienced the service anomaly. In one embodiment, analysis of historical information comprises reviewing network status information comprising at least one of performance data, usage data, telemetry data, and event data. In one embodiment, the one or more conditions comprise at least one material event that is present during the service anomaly.

Systems and method for identifying a network event signature indicative that it is probable that a user of a network will experience a predetermined service anomaly are provided. A predetermined service anomaly is selected. A subset of network elements that may include at least one cause of the predetermined service anomaly is identified. The presence of the event signature within the subset of network elements is detected. A configuration change is caused to be made to the subset of network elements to deter the predetermined service anomaly.

In one embodiment, the predetermined service anomaly comprises at least one of a network fault and a measured degradation of network performance. In one embodiment, causing a configuration change comprises adding at least one hardware device to the subset of network elements. In one embodiment, the operation of causing a configuration change comprises adding at least one virtual network element to the subset of network elements. In one embodiment, adding virtual network resources comprises adding at least one virtual machine to the subset of network elements. In one embodiment, the event signature comprises one or more network conditions that were present during a predetermined percentage of instances when the service anomaly occurred in the past.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
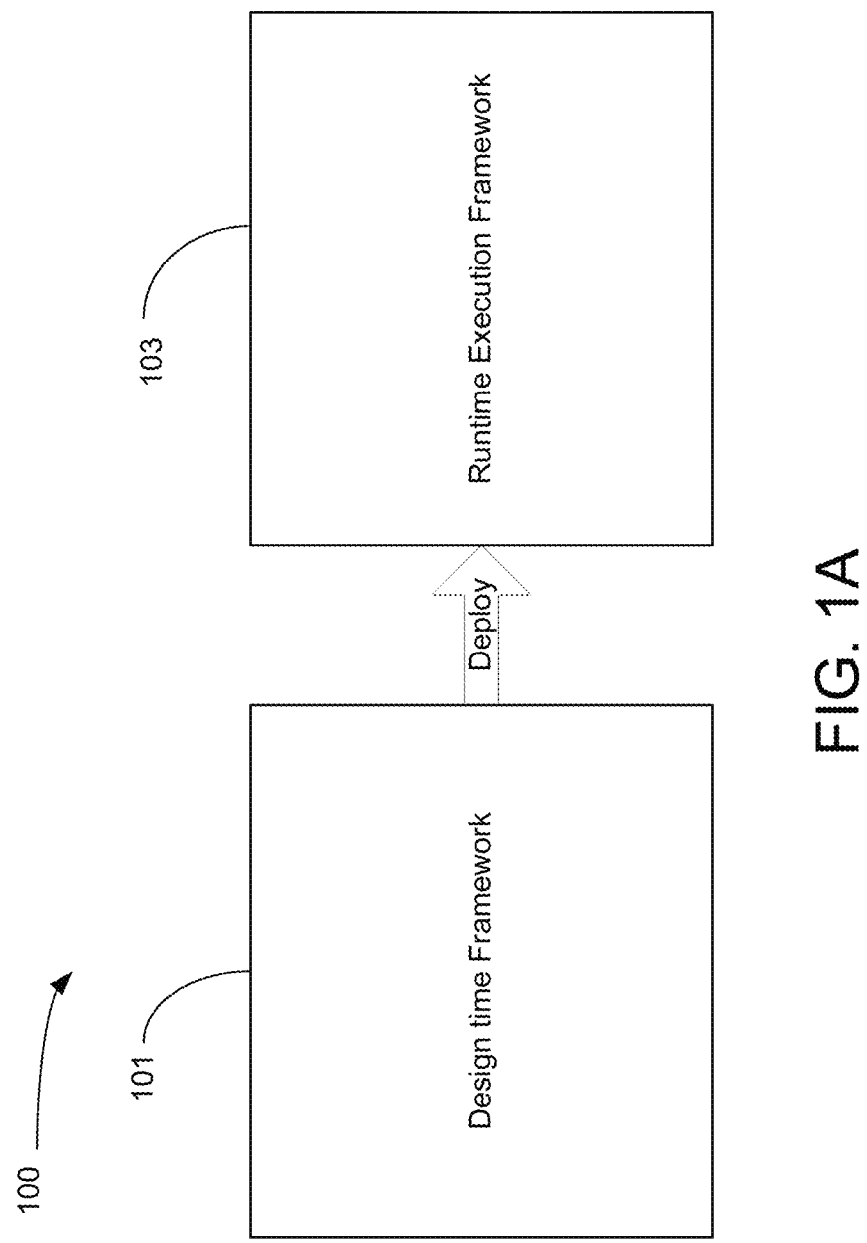
FIG. 1A is a functional block representation of an enhanced control, orchestration, management and policy (ECOMP) platform 100.

Illustrated in FIG. 1A is a schematic of the architecture of an enhanced control, orchestration, management and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates reuse models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 1B:
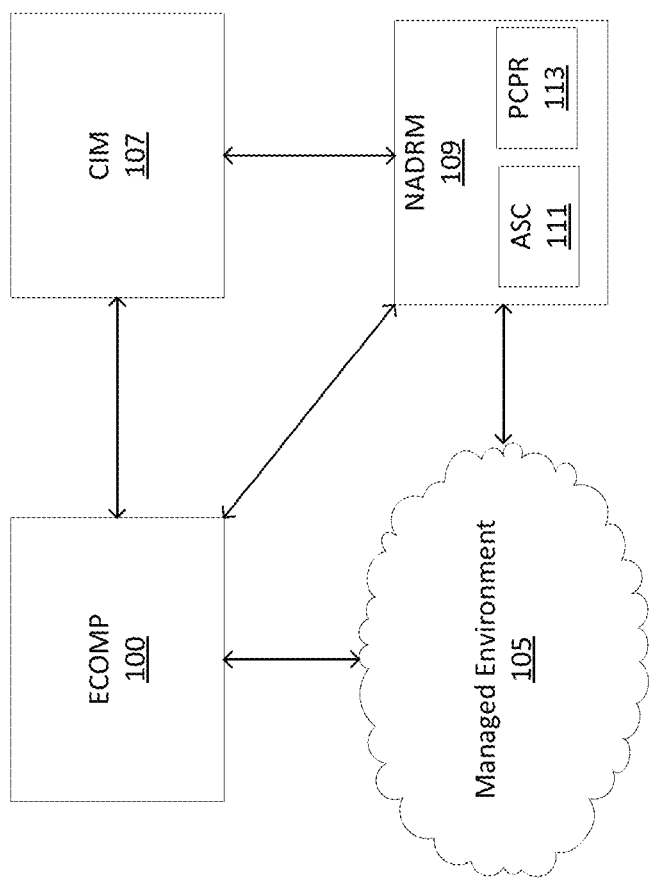
FIG. 1B is a functional block representation of the ECOMP platform of FIG. 1B interacting with a managed environment, a customer interaction management (CIM) platform, and a network anomaly diagnosis and resolution module (NADRM).

Referring to FIG. 1B, ECOMP platform 100 in one embodiment may interface with a managed environment 105, a customer interaction management (CIM) platform 107, and a network anomaly diagnosis and resolution module (NADRM) 109. In one example, managed environment 105 may include one or more instances of any or all of an IP Core Network, a cloud computing network, a mobility access network, a wireline access network, and/or a satellite television network. Networks 105 are utilized to provide products and services to customers. ECOMP platform 100 is utilized by a network service provider to manage the managed environment 105.

CIM platform 107 in one embodiment provides the functionality by which users of networks 105 may interact with the entities, such as network service providers, which manage the managed environment 105. CIM platform may include customer portals, customer relationship management (CRM) applications, diagnostic systems, and reporting and notification systems.

NADRM 109 in one embodiment provides the functionality by which network anomalies may be predicted, diagnosed, and resolved. NADRM 109 in one embodiment comprises anomaly signature creation module (ASC) 111 and proactive customer problem resolution (PCPR) 113 module. A more detailed description of NADRM 109 will be provided further herein.

Figure 2A:
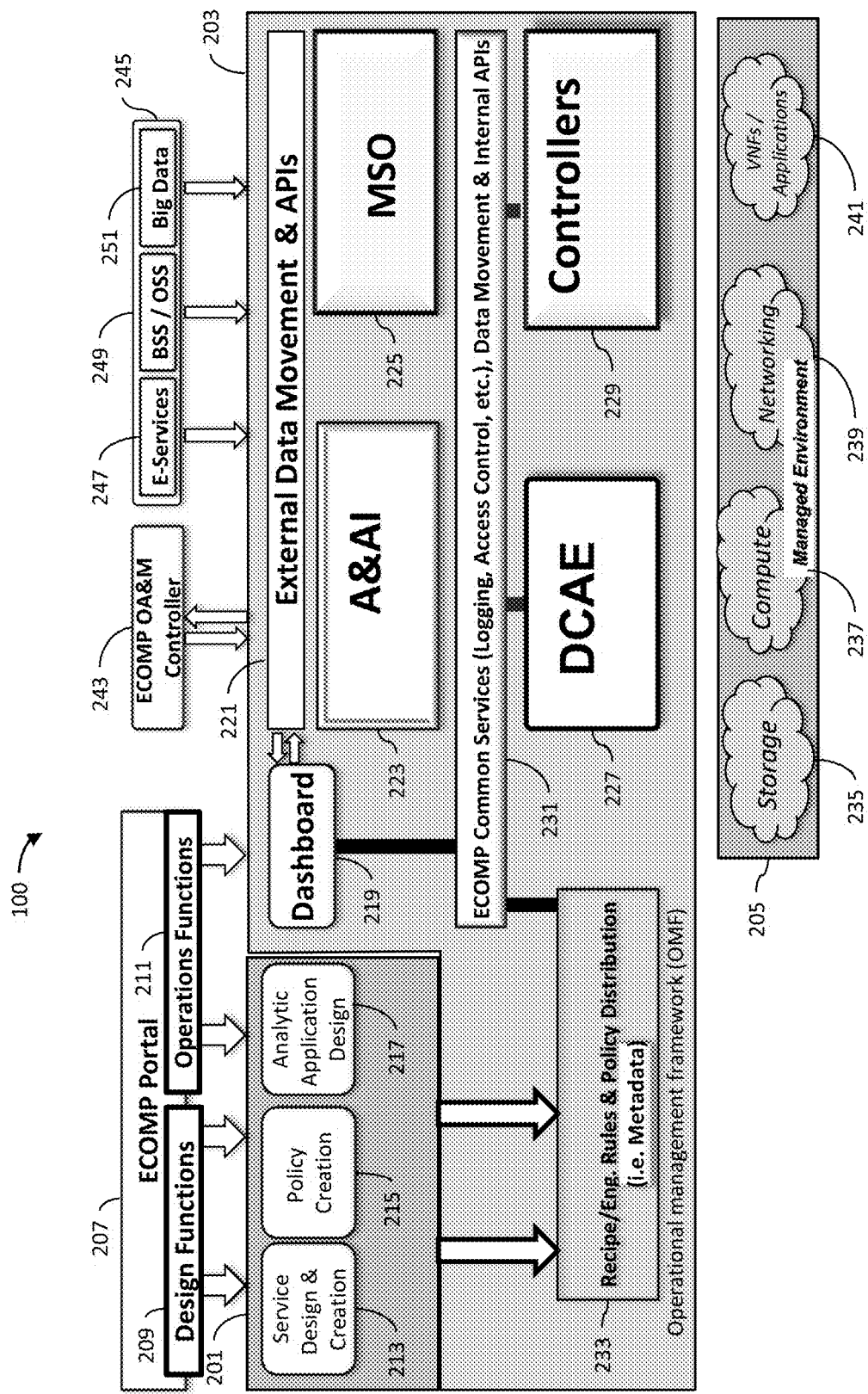
FIG. 2A is an exemplary representation of the ECOMP platform of FIG. 1A.

Illustrated in FIG. 2A are the components of an exemplary embodiment of the ECOMP platform 100. The ECOMP platform 100 is provided with three environments. These are the design creation environment 201, the execution environment 203, and the managed environment 205 shown as shaded areas in FIG. 2A.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221);

an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 provides networking services to users. The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Additional description regarding the components is disclosed below. The policy creation component 215 deals with policies, which are conditions and requirements, constraints, attributes, or needs that must be provided, maintained, or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor; policy rules subcomponent; conflict identification subcomponent; policy storage subcomponent. The policy storage subcomponent may include a library and templates.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK), and storage for key performance indicators (KPIs), alarms, operators, etc., as well as storage for analytic application.

The dashboard 219 includes a manual action subcomponent, a reporting subcomponent 403 and a topology visualization subcomponent. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule, an entitlements submodule and a resource/service topology submodule.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:
  Provide accurate and timely views of resource, service, and product inventory and their relationship to the customer's subscription;
  Deliver topologies and graphs;
  Maintain relationships to other key entities (e.g., location) as well as non-integrated cloud environment inventory;
  Maintain the state of active, available and assigned inventory within the ECOMP platform 100;
  Allow introduction of new types of Resources, Services, and Products without a software development cycle (i.e., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (i.e., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs 25 consistent with configurable framework constraints.

The primary function of MSO 225 is the automation of end-to-end service instance provisioning activities. MSO 225 includes a request handler, an orchestration engine, adapters, and service catalog service recipes. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

DCAE module 227 includes an analytic applications module, streaming framework, an events pub/sub, real-time collectors, APIs, and batch collector. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations.

A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and troubleshooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Referring now to FIG. 1B, as was mentioned previously, NADRM 109 in one embodiment comprises ASC 111 and PCPR 113. ASC 111 comprises the functionality by which NADRM 109 identifies signatures that correspond to anomalies. In one example, a signature is a pattern in observed data that may point to a network or service anomaly experienced and reported by the customer. A signature can be used by NADRM 109 to detect an anomaly and perform one or more actions to eliminate or reduce the impact of the anomaly. A signature may also be used by NADRM 109 to predict a future anomaly and to perform one or more actions to prevent or lessen the impact of the anomaly. In one example, the one or more actions that NADRM 109 may perform to address an anomaly could be to request that a human agent perform one or more actions to address the network anomaly. In another example, NADRM 109 may perform an automated workflow to address the anomaly. For instance, NADRM 109 may request that ECOMP 100 perform one or more actions to address the anomaly. In another example, the NADRM 109 may request that a customer perform one or more actions to address the anomaly.

An example of an action that may be taken in response to an anomaly may include changing the configuration of the managed environment 105. For instance, one or more hardware and/or software resources may be added or removed from the managed environment or the topology of the managed environment may be changed. One example would be to add or remove one or more hardware devices, such as routers, switches, and servers from the managed environment 105. Another example would be to add or remove one or more virtual machines (VMs) and/or virtual network functions (VNFs) from the managed environment. Another example may be to allocate dedicated VNFs to support affected customer devices or move VNFs to the network edge to improve the latency time.

Figure 1C:
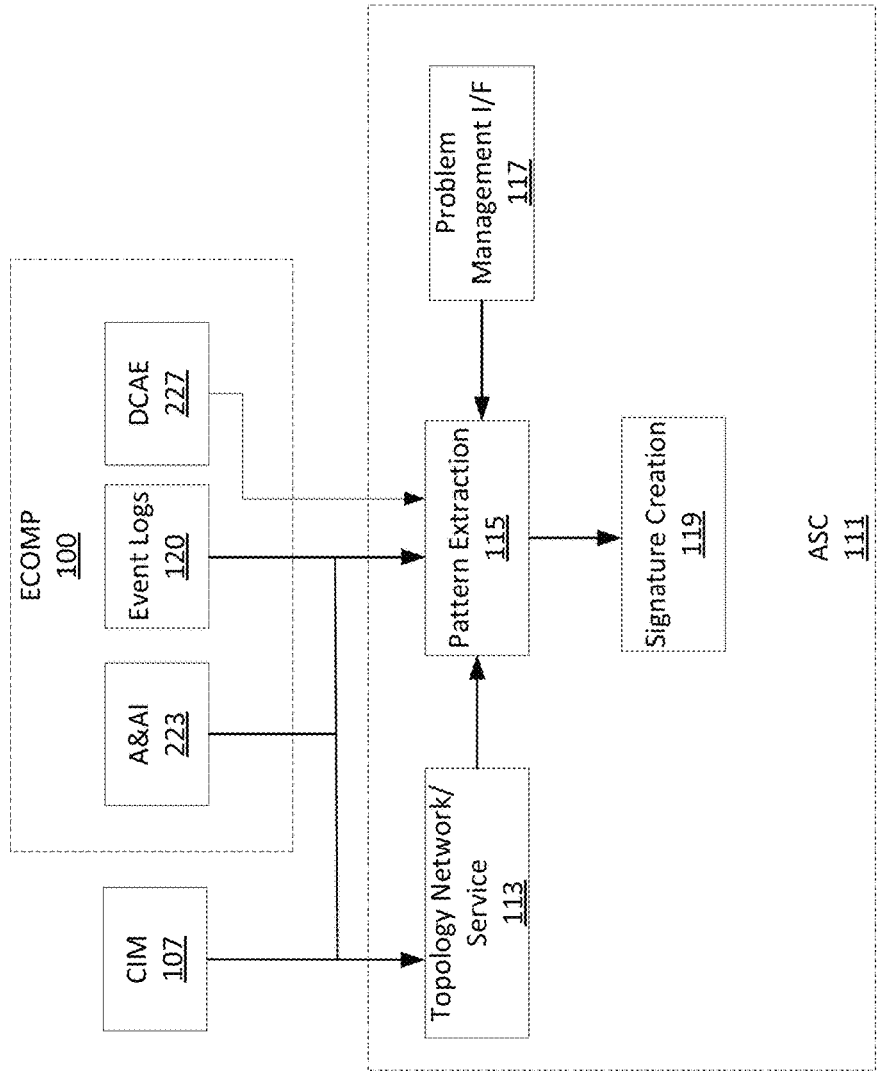
FIG. 1C is an illustrative embodiment of an anomaly signature creation module (ASC) shown in FIG. 1B.

Referring now to FIG. 1C, an illustrative descriptive embodiment of ASC 111 is now provided for illustrative purposes. ASC 111 in one embodiment comprises topology network/service component 113, pattern extraction component 115, problem management interface 117, and signature creation component 119.

In one embodiment, topology network/service component 113 receives customer case and trouble reports from CIM 107, topology data from active and available inventory module 223 (FIG. 2A), and event logs 120 from ECOMP 100. Topology network service component 113 identifies the topology of managed environment 105 that is associated with the customer trouble reports and event logs. The topology is input into pattern extraction component 115. In one example, the information that ASC 111 receives from CIM 107 may relate to the trouble history that one or more users of the managed environment 105 may experience. Examples of such trouble history may include, but are not limited to, customer relationship management (CRM) data (customer case and trouble history), customer device information, customer troubleshooting and resolution data.

In one embodiment, pattern extraction component 115 receives the same data as topology network/service component 113 in addition to data from DCAE module 227 and problem management interface 117. In one example, the data from DCAE module 227 includes existing signature information and supplemental information from a central data lake associated with DCAE module 227. In one example, the supplemental information includes but is not limited to aggregated historic network and service datasets. The data from problem management interface 117 in one example may include information input directly from customer identifying the nature of a problem or anomaly and the customer device and/or services affected by the anomaly. Such information may be input through an application that may be added to an existing (or a new) customer problem resolution portal available on a customer smartphone, TV and/or the internet. Such an app will enable customers to input notice of a service impairment and other intermittent problems. Pattern extraction component 115 correlates network event data received from ECOMP 100 with the topology data and customer trouble information received from CIM 107 and problem management interface 117. Pattern extraction component 115 then provides the correlated data to signature creation component 119, which then creates one or more signatures that are associated with one or more anomalies.

Figure 2B:
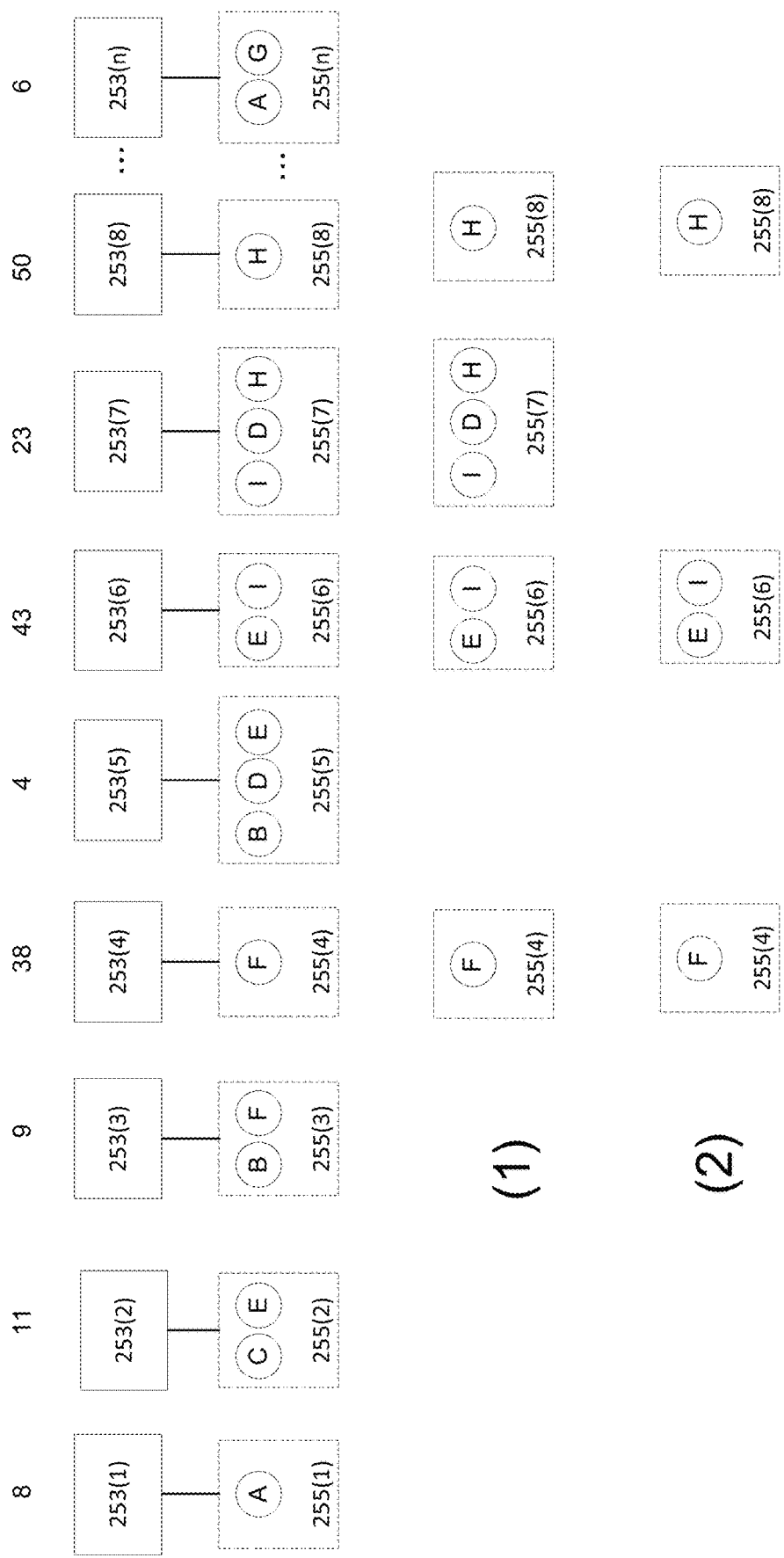
FIG. 2B is an illustrative representation of one embodiment of a signature creation process.

Referring now to FIG. 2B, an exemplary representation of signature creation is provided for illustrative purposes. In one embodiment, a particular customer problem 253 may be selected for observation. Customer problem 253 could be any anomaly or condition that affects a customer's service that the customer deems worthy of reporting to the network operator or for which the network operator has knowledge. Examples of customer problem 253 include, but are not limited to, pixilation, latency issues, connectivity issues, unexpected rebooting of devices, and screen freeze issues.

In the example shown, there is a plurality of instances of customer problem 253(1) . . . 253(n) that are each associated with a corresponding event set 255(1) . . . 255(n). The correlation of event sets 255(1) . . . 255(n) in one example is performed by pattern extraction component 115. In one example, an event set 255 may be a one or more network events or conditions that are present when the customer problem 253 occurs. For instance, one condition may be that network throughput falls below is a certain threshold. Another condition may be that packet delivery latency time exceeds a predetermined threshold. Another example would be virtual video servers exceeding 80% of virtual CPU time. In another example would be auto-scaling of resources being limited due to other processes running in one or more datacenters. For clarity, events are labeled with characters A-H. Each event set 255(1) . . . 255(n) may include one or more events A-H. A customer problem 253 in one example may be observed a number of times in association with a particular event set 255(1) . . . 255(n) during a particular time period (week, month, hours, etc.) For instance, customer problem 253(1) with corresponding event set 255(1) may be observed 8 times; customer problem 253(2) with corresponding event set 255(2) may be observed 11 times; customer problem 253(3) with corresponding event set 255(3) may be observed 9 times, and so forth. Furthermore, each instance of customer problem 253 may be associated with one or more events. Event set 255(1) comprises event "A"; event set 255(2) comprises events "C" and "E"; event set 255(3) comprises events "B" and "F" and so forth.

In the example shown, customer problem 253 occurred with n different event sets 255(1) . . . 255(n). The total number of occurrences of customer problem is 192. In one example, signature creation component 119, in step 1, may be select an event threshold in order to identify those events that have a high probability of correlation to the customer problem 253. Using the data in FIG. 2B, it can be seen that event set 255(4), event set 255(6), event set 255(7), and event set 255(8) make up a total of 154 out of the 192 occurrences of customer problem 253, or phrased 80% (154/192) of the occurrences of customer problem 253. Accordingly, to set an event threshold of 80% would be to select the largest event sets 255 that equal or exceed 80% of the occurrences of problem 253. The remaining event sets may be ignored.

Using this methodology, it can be seen that customer problem 253 is likely to occur when event "F" is present due to event set 255(4) or when events "E" and "I" occur due to event set 255(6) or when events "I", "D", and "H" occur due to event set 255(7) occurs or when event "H" occurs due to event set 255(8). However, because "H" occurs in combination with "I" and "D" in event set 255(7) and alone in set 255(8), event set 255(7) is redundant and can be disregarded, as shown in step 2. Therefore, event sets 255(4), 255(6), and 255(8) can be set as a minimum event set with an event threshold of 80%. When event "F" or events "E" and "I" or event "H" occurs, customer problem 253 is likely to occur and thus the signature for customer problem 253 is F+(E*I)+H.

Figure 1D:
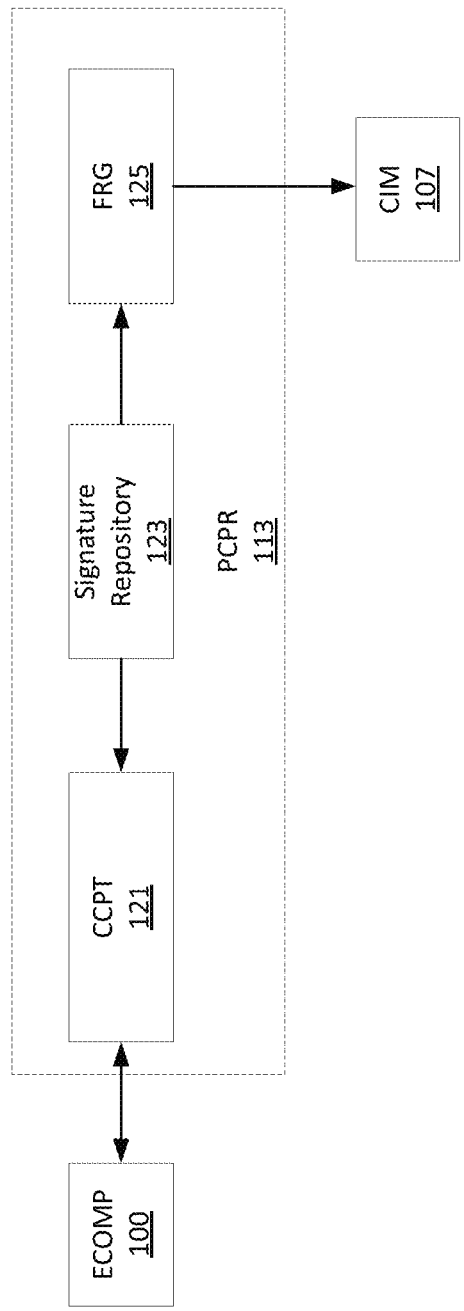
FIG. 1D is an illustrative embodiment of a proactive customer problem resolution (PCPR) 113 module shown in FIG. 1B.

Referring now to FIG. 1D, in one embodiment, upon creation of a signature, ASC 111 provides the signature to PCPR 113 for proactive identification and resolution of the customer problem 253 predicted by the signature. PCPR 113 in one example comprises customer care proactive trigger (CCPT) module 121, signature repository 123, and flow/rule generator (FRG) 125.

CCPT module 121 in one embodiment is a near real-time function. CCPT contains a policy enabled micro service module which receives a real time event stream from ECOMP 100 and matches signatures from signature repository 123 with events occurring in managed environment as reflected in the real time event stream that it receives from ECOMP 100. When real time events occur in managed environment 105 that match a signature, CCPT module 121 generates a response. Examples of responses include, but are not limited to, requesting additional data from ECOMP, requesting live agent intervention, and/or triggering automated workflows that resolve the anomaly.

FRG 125 in one embodiment retrieves signatures from signature repository 123 and creates and/or updates workflows to respond to the customer problem 253 associated with the signature. In one example, the workflow may be to request that the network allocate more resources, or move one or more VNFs from one host region to another. In another example, the workflow may comprise multiple steps, including one or more manual steps. In one example, there may be multiple workflows to respond to the customer problem 253. An example workflow would be if a signature resulted in the detection of latency in a particular location that impacted 100 customers, the following workflow may be used: (1) Identify services subscribed to by the 100 customers to determine the scope of the fix. (2) Maintains a portion of the customers being served by the same set of compute and network servers due to contractual obligation. (3) Locate an optimal migration path. (4) Establish a virtual environment to start the migration path. (5) For affected customers who had reported the trouble to the provider, a notification message will be delivered to them advising the issue has been mitigated.

Figure 3:
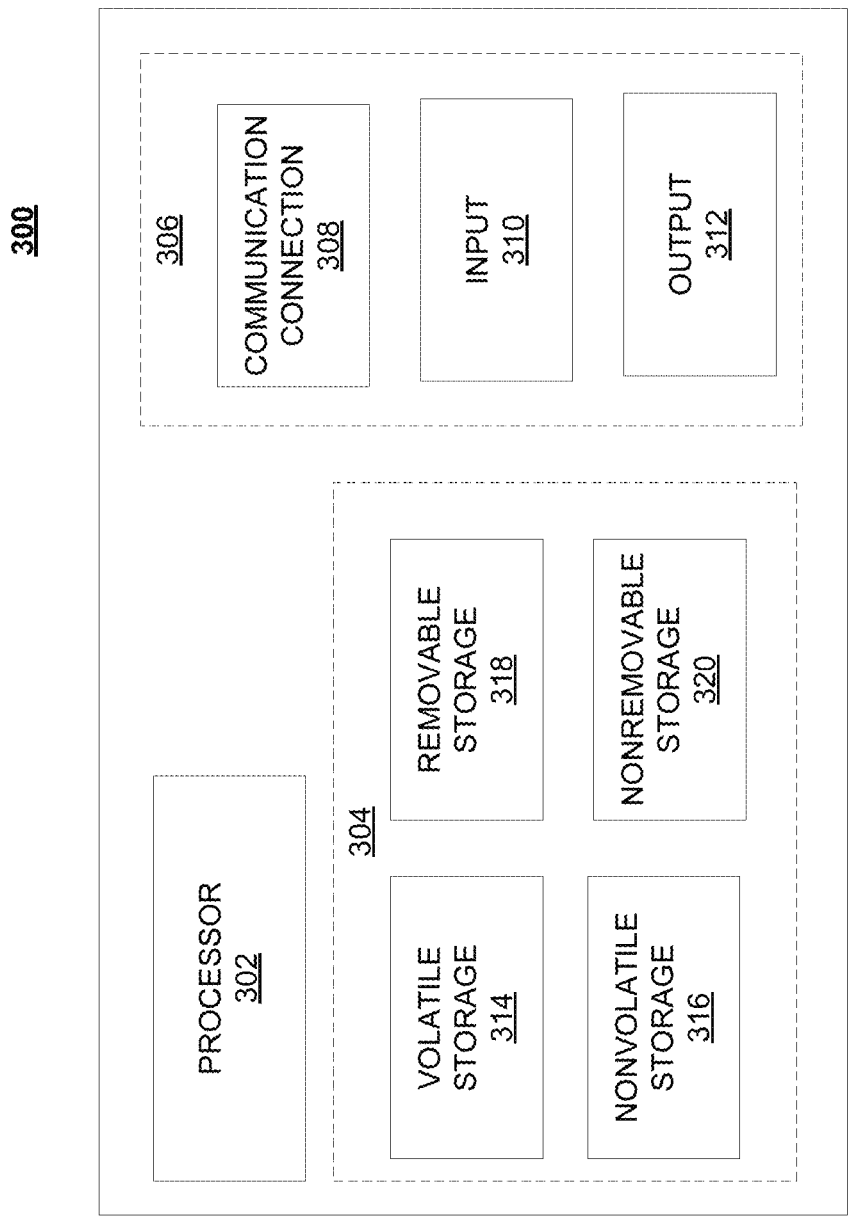
FIG. 3 is a representation of a network device according to an example.

Referring to FIG. 3, NADRM 109 may be implemented on a network device, an example of which is illustrated in FIG. 3 as a functional block diagram. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
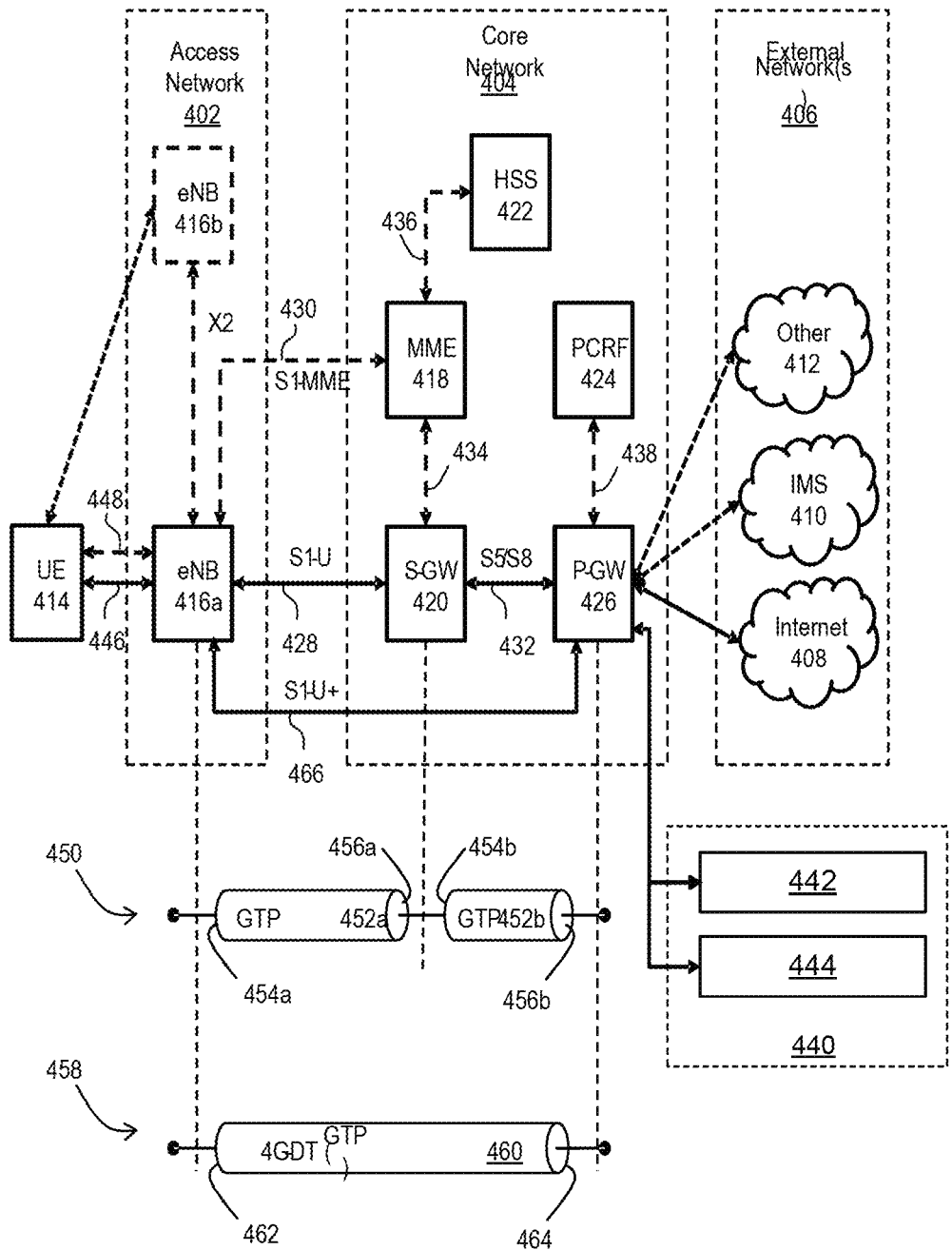
FIG. 4 depicts an exemplary communication system that provides wireless telecommunication services over wireless communication networks that may be at least partially virtualized.

FIG. 4 illustrates a functional block diagram depicting one example of an LTE-EPS network architecture 400 that may be at least partially implemented as an SDN. In one example, managed environment 105 may comprise all or a portion of network architecture 400. Network architecture 400 disclosed herein is referred to as a modified LTE-EPS architecture 400 to distinguish it from a traditional LTE-EPS architecture. It should be noted that the network architecture is provided for illustrative purposes. The functionality described above is network independent and can be applied to other wired and/or wireless networks.

An example modified LTE-EPS architecture 400 is based at least in part on standards developed by the 3rd Generation Partnership Project (3GPP), with information available at www.3gpp.org LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
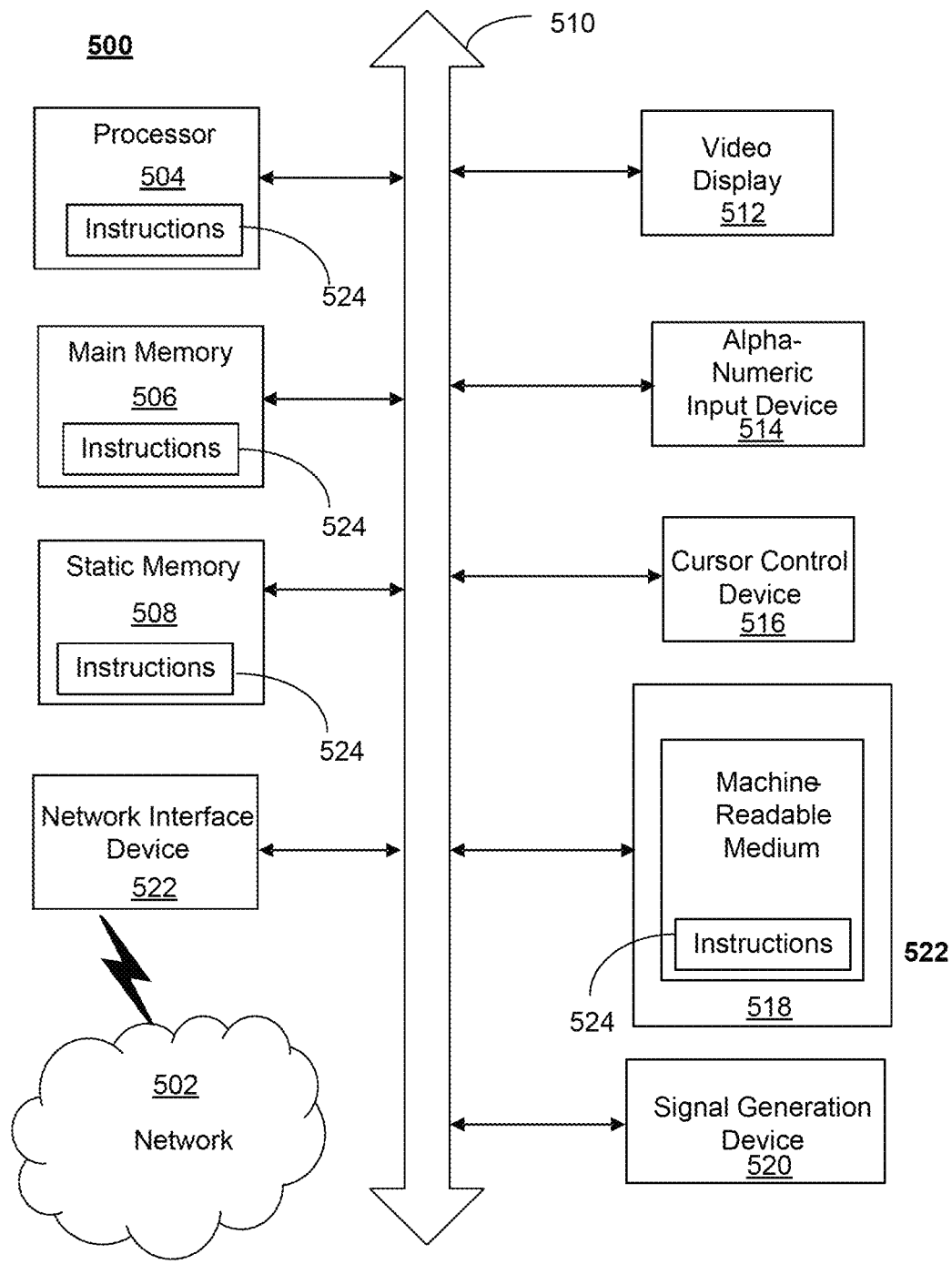
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described herein. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of systems and methods for management of virtualized devices have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The invention claimed is:

1. A system to manage operation of at least one network comprising:
   a processor, an input/output device coupled to the processor, and a memory coupled with the processor, the memory comprising executable instructions that when executed by the processor cause the processor to effectuate operations comprising:
      receiving data from a user management system that provides information regarding network service anomalies, wherein the information includes customer data and network topology data;
      identifying, through correlation of the customer data to the network topology data, at least one event signature associated with an event, wherein the event signature is indicative that it is probable that at least one user of the network will experience a predefined service anomaly, wherein the predetermined service anomaly arises from a source within the network itself;
      receiving a real time event stream from a management and policy platform that manages the network, wherein the event stream provides a real time state of the network;
      detecting the presence of the at least one event signature in the real time data stream, wherein detecting comprises searching the data stream for presence of the at least one event signature;
      causing a workflow to be implemented on the network to deter the predefined service anomaly, wherein the workflow comprises moving at least one virtual function from one part of the network to another part of the network, identifying at least one migratable network service that may be moved to the other part of the network, identifying at least one non-migratable service that may not be moved to the other part of the network, moving the migratable service to the other part of the network, and maintaining the non-migratable service on the one part of the network; wherein the at least one event signature is created through identifying a plurality of event sets, from the real time event stream, that are present when the predefined service anomaly is present; and setting an event threshold which is a percentage of time the predetermined service anomaly is present when a subgroup of the event sets is present, and identifying the event signature as presence of the subgroup of event sets.

2. The system of claim 1, wherein identifying comprises:
   analyzing historical information describing operation of the network during a time period;
   identifying at least one occurrence of the service anomaly; and
   detecting that one or more conditions were present before or during the service anomaly.

3. The system of claim 2, wherein analyzing historical information comprises reviewing user information taken during the time period, wherein the user information contains at least one indication that the at least one user experienced the service anomaly.

4. The system of claim 3, wherein analyzing historical information comprises:
   reviewing network status information comprising at least one of performance data, usage data, telemetry data, and event data.

5. The system of claim 4, wherein the one or more conditions comprise at least one material event that is present during the service anomaly.

6. The system of claim 5, wherein a material event comprises at least one occurrence associated with at least one of network resource scaling, a network configuration change, a network fault, and network performance degradation.

7. A method to manage operation of at least one network comprising:
   receiving data from a user management system that provides information regarding network service anomalies, wherein the information includes customer data and network topology data;
   identifying, through correlation of the customer data to the network topology data, at least one event signature associated with an event, wherein the event signature indicates that it is probable that at least one user of the network will experience a predefined service anomaly, wherein the predetermined service anomaly arises from a source within the network itself;
   receiving a real time event stream from a management and policy platform that manages the network, wherein the event stream provides a real time state of the network;
   detecting the presence of the at least one event signature on the network in the real time data stream, wherein detecting comprises searching the data stream for presence of the at least one event signature;
   causing a workflow to be implemented on the network to deter the predefined service anomaly, wherein the workflow comprises moving at least one virtual function from one part of the network to another part of the network, identifying at least one migratable network service that may be moved to the other part of the network, identifying at least one non-migratable service that may not be moved to the other part of the network, moving the migratable service to the other part of the network, and maintaining the non-migratable service on the one part of the network; wherein the at least one event signature is created through identifying a plurality of event sets, from the real time event stream, that are present when the predefined service anomaly is present; and setting an event threshold which is a percentage of time the predetermined service anomaly is present when a subgroup of the event sets is present, and identifying the event signature as presence of the subgroup of event sets.

8. The method of claim 7, wherein identifying comprises:
analyzing historical information describing operation of the network during a time period;
identifying at least one occurrence of the service anomaly; and
detecting that one or more conditions are present during the service anomaly.

9. The method of claim 8, wherein analyzing historical information comprises reviewing user information taken during the time period, wherein the reports contain at least one indication that the at least one user experienced the service anomaly.

10. The method of claim 9, wherein analyzing historical information comprises:
reviewing network status information comprising at least one of performance data, usage data, telemetry data, and event data.

11. The method of claim 9, wherein the one or more conditions comprise at least one material event that is present during the service anomaly.

12. The method of claim 11, wherein the at least one material event comprises at least one occurrence associated with at least one of network resource scaling, a network configuration change, a network fault, and network performance degradation.

13. A method for identifying a network event signature indicative that it is probable that a user of a network will experience a predetermined service anomaly, the method comprising:
receiving data from a user management system that provides information regarding network service anomalies, wherein the information includes customer data and network topology data;
selecting a predetermined service anomaly;
identifying, through correlation of the customer data and network topology data, at least one event signature associated with an event, wherein the event signature is indicative that it is probable that at least one user of the network will experience the predefined service anomaly, wherein the predetermined service anomaly arises from a source within the network itself;
locating a subset of network elements that may include at least one cause of the predetermined service anomaly, wherein the predetermined service anomaly comprises at least one of a network fault and a measured degradation of network performance;
detecting the presence of the event signature within the subset of network elements;
causing a configuration change to the subset of network elements to deter the predetermined service anomaly, wherein the configuration change comprises moving at least one network element from one part of the network to another part of the network, identifying at least one migratable network service that may be moved to the other part of the network, identifying at least one non-migratable service that may not be moved to the other part of the network, moving the migratable service to the other part of the network such that it is serviced by the at least one network element, and maintaining the non-migratable service on the one part of the network; wherein the at least one event signature is created through identifying a plurality of event sets, from the real time event stream, that are present when the predefined service anomaly is present; and setting an event threshold which is a percentage of time the predetermined service anomaly is present when a subgroup of the event sets is present, and identifying the event signature as presence of the subgroup of event sets.

14. The method of claim 13, wherein the operation of causing a configuration change comprises adding at least one hardware device to the subset of network elements.

15. The method of claim 13, wherein the operation of causing a configuration change comprises adding at least one virtual network element to the subset of network elements.

16. The method of claim 15, wherein adding virtual network resources comprises adding at least one virtual machine to the subset of network elements.

17. The method of claim 15, wherein the event signature comprises one or more network conditions that were present during a predetermined percentage of instances when the service anomaly occurred in the past.

\* \* \* \* \*